(12) United States Patent
Matthiesen et al.

(10) Patent No.: US 8,735,487 B2
(45) Date of Patent: May 27, 2014

(54) TIRE COMPONENTS WITH IMPROVED HEAT TRANSFER

(75) Inventors: Mary M. Matthiesen, Lakewood, OH (US); Amy Randall, Akron, OH (US); Mindaugas Rackaitis, Massillon, OH (US)

(73) Assignee: Bridgestone Corporation, Tokyo (JP)

( * ) Notice: Subject to any disclaimer, the term of this patent is extended or adjusted under 35 U.S.C. 154(b) by 544 days.

(21) Appl. No.: 12/494,995

(22) Filed: Jun. 30, 2009

(65) Prior Publication Data

US 2010/0000650 A1    Jan. 7, 2010

Related U.S. Application Data

(60) Provisional application No. 61/078,170, filed on Jul. 3, 2008, provisional application No. 61/079,626, filed on Jul. 10, 2008.

(51) Int. Cl.
*C08K 3/34*    (2006.01)
*C08K 3/38*    (2006.01)

(52) U.S. Cl.
USPC .......................................... 524/493; 524/404

(58) Field of Classification Search
USPC .......... 524/404, 495, 496, 493; 152/450, 525, 152/564
See application file for complete search history.

(56) References Cited

U.S. PATENT DOCUMENTS

| | | | |
|---|---|---|---|
| 2,871,216 A * | 1/1959 | Anderson, Jr. ................. | 524/404 |
| 3,050,490 A | 8/1962 | Nitzsche et al. | |
| 4,763,158 A | 8/1988 | Schlueter et al. | |
| 5,194,480 A | 3/1993 | Block et al. | |
| 6,037,397 A | 3/2000 | Satoh et al. | |
| 6,342,552 B1 * | 1/2002 | Hergenrother et al. ....... | 524/264 |
| 6,410,893 B1 | 6/2002 | Yagnik et al. | |
| 6,591,879 B1 * | 7/2003 | Beckmann et al. ........... | 152/153 |
| 6,762,395 B2 | 7/2004 | Yagnik et al. | |
| 6,764,975 B1 | 7/2004 | Clere | |
| 6,831,031 B2 | 12/2004 | Ishihara | |
| 6,874,573 B2 | 4/2005 | Collins et al. | |
| 7,189,774 B2 | 3/2007 | Clere | |
| 7,321,107 B2 | 1/2008 | Yagnik et al. | |
| 2002/0036043 A1 * | 3/2002 | Victor Thielen ............... | 152/517 |
| 2002/0150524 A1 * | 10/2002 | Smalley et al. ................ | 422/198 |
| 2005/0175829 A1 * | 8/2005 | Aoki et al. .................. | 428/295.1 |
| 2007/0227299 A1 * | 10/2007 | Marchiando et al. ........... | 75/244 |
| 2008/0076856 A1 * | 3/2008 | Zhong et al. .................... | 524/81 |

FOREIGN PATENT DOCUMENTS

| | | |
|---|---|---|
| JP | 05 179072 | 7/1993 |
| JP | 2005179617 A * | 7/2005 |
| WO | WO 2005047025 A1 * | 5/2005 |

OTHER PUBLICATIONS

Golberg, D. Bando, Y., Tang, C., Zhi, C. Advanced Materials, vol. 19, p. 2413-2432, Aug. 22, 2007.*
Translation of JP2005-179617, Jul. 7, 2005.*
Wypych, George, Handbook of Fillers, ChemTec Publishing, Toronto, p. 46, 1999.
Marketing and Technical literature from GE Advanced Ceramics, a manufacturer of boron nitride powders.
S.K. Maity, K.K. Chakraboty, "Studies on Curing Characteristics of Natural Rubber—, Nitrile Rubber—, and Silicone Rubber-Based Filled Compounds in the Presence of Boron Nitride Compounds," Die Angewandte Makromolekulare Chemie 221: 11-31 (1994).
M. Bafrnec, M. Jana, J. Toman, J. Jurciova, A. Kucma, "Thermal Diffusivity of Rubber Compounds," Plastics, Rubber, and Composites 28(10): 482-486 (1999).
W. Zhou, S. Qi, H. Zhao, N. Liu, "Thermally Conductive Silicone Rubber Reinforced with Boron Nitride Particle," Polymer Composites 28(1): 23-28 (2007).
W. Zhou et al., Thermochimica Acta, 452 (2007) 36-42.

* cited by examiner

*Primary Examiner* — Hui Chin
(74) *Attorney, Agent, or Firm* — Meredith E. Hooker; Arthur M. Reginelli

(57) ABSTRACT

A tire comprising at least one cured rubber component having boron nitride dispersed within a cured rubber matrix.

11 Claims, 1 Drawing Sheet

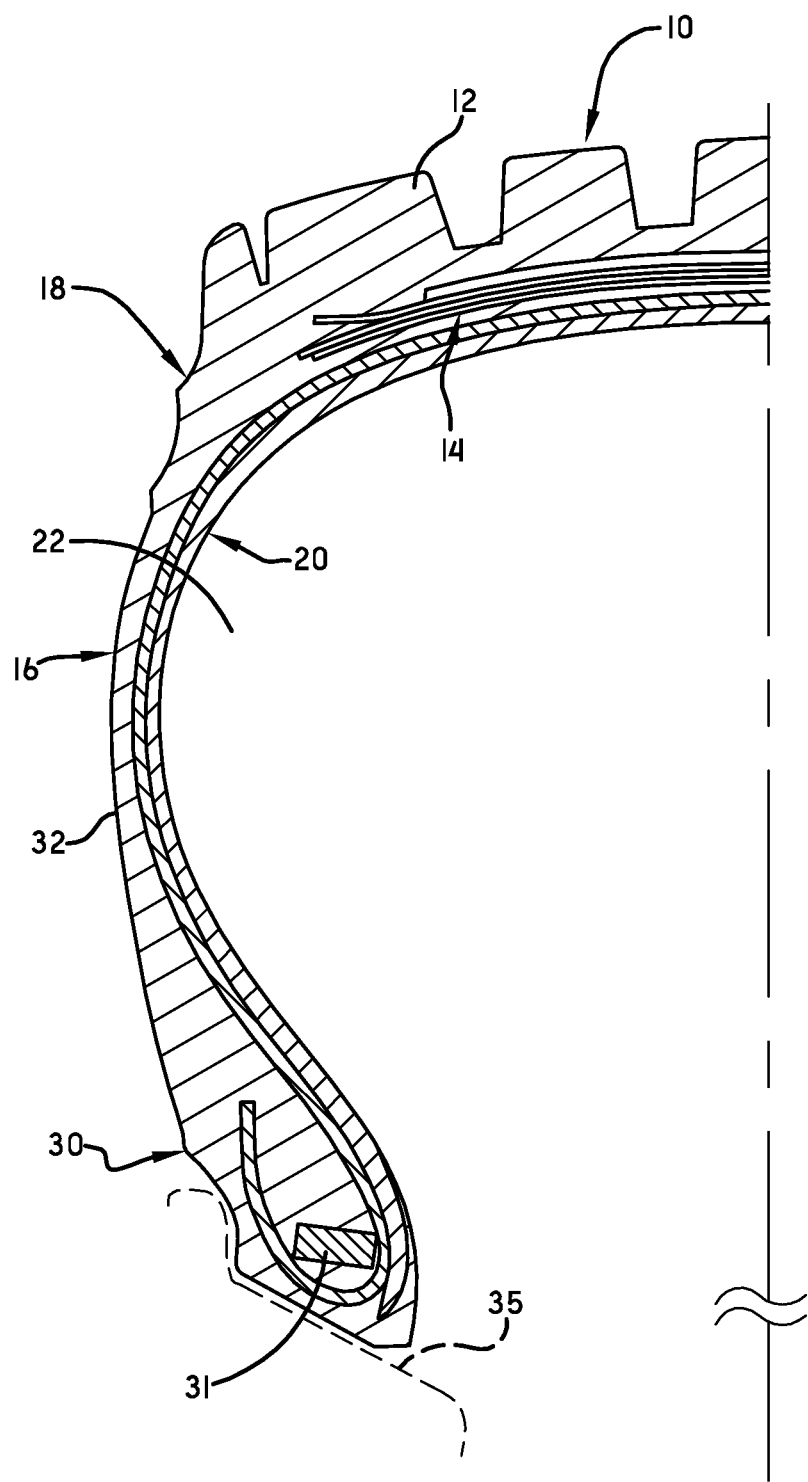

TIRE COMPONENTS WITH IMPROVED HEAT TRANSFER

This application claims the benefit of U.S. Provisional Application Ser. Nos. 61/078,170 filed Jul. 3, 2008 and 61/079,626, filed Jul. 10, 2008, and are incorporated herein by reference.

FIELD OF THE INVENTION

One or more embodiments of this invention relate to tires, tire components, and vulcanizable compositions for making tire components that include boron nitride.

SUMMARY OF THE INVENTION

One or more embodiments of the present invention provide a tire comprising at least one cured rubber component having boron nitride dispersed within a cured rubber matrix.

BRIEF DESCRIPTION OF THE DRAWINGS

FIG. 1 is a half cross-sectional view of a tire according to one or more embodiments of this invention.

DETAILED DESCRIPTION OF ILLUSTRATIVE EMBODIMENTS

One or more embodiments of the present invention derive from the discovery that boron nitride can be used in addition to or as a partial replacement for reinforcing fillers in tire components without a deleterious impact on mechanical or dynamic properties of the tire component. The presence of the boron nitride advantageously improves the heat transfer properties of the tire component.

An example of a tire that may include a tire component including boron nitride according to the present invention is shown in FIG. 1. Tire 10 includes a tread portion 12, a belt package 14, a sidewall 16, a shoulder portion 18, an innerliner ply 20, a cavity 22, and a bead portion 30 that includes bead core 31. Carcass 32 extends between bead portion 30 and a complementary bead not shown. Bead core 31 helps to hold bead portion 30 against vehicle rim 35. Pneumatic tires and methods for making them are disclosed in U.S. Pat. Nos. 5,866,171, 5,876,527, 5,931,211, and 5,971,046, which are incorporated herein by reference.

Various forms of boron nitride may be employed in practicing the present invention. As those skilled in the art appreciate, boron nitride is a synthetically engineered material that is commercially available as particles in powder or pellet form. They are likewise available in a variety of shapes, sizes, and crystal structures.

In one or more embodiments, the boron nitride is characterized by a hexagonal crystal structure. In other embodiments, the boron nitride is characterized by a cubic crystal structure. In certain embodiments, the boron nitride may be characterized as having a plate-like geometry or structure. In other embodiments, the boron nitride may be characterized by having a random geometry or particle size. In other embodiments, the boron nitride may be characterized by a generally spherical structure or geometry.

In one or more embodiments, the boron nitride is in the form of particles that may be characterized by the mean size of their largest dimension. In one or more embodiments, the mean size of their largest dimension, which may also be referred to as mean particle size, may be at least 0.01 μm, in other embodiments at least 0.1 μm, in other embodiments at least 1 μm, in other embodiments at least 3 μm, in other embodiments at least 5 μm, in other embodiments at least 7 μm, in other embodiments at least 10 μm, in other embodiments at least 15 μm, in other embodiments at least 20 μm, in other embodiments at least 30 μm, and in other embodiments at least 50 μm. In these or other embodiments, the mean size of their largest dimension may be less than 150 μm, in other embodiments less than 100 μm, in other embodiments less than 75 μm, in other embodiments less than 50 μm, in other embodiments less than 25 μm, and in other embodiments less than 15 μm.

Where the boron nitride generally has a plate-like structure, the size of the particles may be described with respect to the size or length of the largest dimension or length of the particle. Further definition may be provided from the aspect ratio, which may be defined as the ratio of the smallest dimension or length of the particle to the largest dimension or length of the particle.

In one or more embodiments, the largest dimension of the plate-like particles of boron nitride may be between 20 and 90 μm. In one or more embodiments, at least 60%, in other embodiments at least 70%, and in other embodiments at least 80% of the particles of plate-like boron nitride employed in the present invention may be characterized by having a largest dimension between about 20 and about 90 μm.

In these or other embodiments, the aspect ratio (i.e. largest dimension to the smallest dimension) of the plate-like boron nitride particles employed in the present invention may be at least 80:1 (where 81:1 is greater than 80:1), in other embodiments at least 100:1, and in other embodiments at least 120:1. In these or other embodiments, the aspect ratio may be less than 200:1, in other embodiments less than 180:1, and in other embodiments less than 160:1.

Specific examples of boron nitride believed to be characterized by a plate-like structure include those available from Momentive Performance Materials PolarTherm under the tradename PT110, which is a powder grade, large single crystal powder in the typical hexagonal platelet (graphite-like) shape. The boron nitride of this product possesses an average particle size of about 45 μm and a low surface area of ~0.6 m2/g. Other examples include those available under the tradename PT111 (Momentive), which is similar to PT110 but screened to remove+200 mesh particles (>74 μm).

Where the boron nitride generally has a random geometry, the size of the particles may be described with respect to the size or length of the largest dimension or length of the particle. In one or more embodiments, the largest dimension of these randomly-shaped particles of boron nitride may be between 1 and 25 μm. In one or more embodiments, at least 60%, in other embodiments at least 70%, and in other embodiments at least 80% of the randomly-shaped particles of boron nitride employed in the present invention may be characterized by having a largest dimension between about 3 and about 25 μm.

In other embodiments, the boron nitride may be characterized as a nano particle. In one or more embodiments, the largest dimension of these nano particles of boron nitride may be between 0.001 μm and 1 μm. In one or more embodiments, at least 60%, in other embodiments at least 70%, and in other embodiments at least 80% of the nano particles of boron nitride employed in the present invention may be characterized by having a largest dimension between about 0.001 μm and about 1 μm.

Specific examples of boron nitride believed to be characterized by a random geometry include those available from Momentive Performance Materials under the tradenames HCP, HCPH, HCPL, and AC6004.

In one or more embodiments, the practice of the present invention (i.e. the inclusion of the boron nitride into the tire components) does not necessarily alter the other ingredients or the methods for preparing the tires. In certain embodiments, the boron nitride replaces a portion of the reinforcing filler, and therefore the overall amount of reinforcing filler may be reduced. In other embodiments, the boron nitride is added to the vulcanizable composition without reducing the amount of reinforcing filler. In other embodiments, the cure times may be reduced due to the improved heat transfer properties of the tire components.

As is known in the art, the tire components of the present invention are prepared from vulcanizable compositions of matter that include a rubber component, a filler component, and curative. The boron nitride is included in the filler component. The vulcanizable composition may also include other components that are commonly employed in the art of making vulcanizable compositions.

In one or more embodiments, the rubber component of the vulcanizable composition may include one or more polymers that are capable of being crosslinked or vulcanized; these polymers may be referred to as rubbery polymers or elastomers. In one or more embodiments, these elastomers may include synthetic polymers such as, but not limited to, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, and epichlorohydrin rubber.

In addition to the boron nitride, the filler component may include other fillers. These other fillers, many of which are common in the art, may be referred to as reinforcing fillers. These fillers may include inorganic and organic fillers. The organic fillers may include, without limitation, carbon black, starch, carbon fibers, aramid fibers, and nano particles as described in U.S. Pat. Nos. 7,238,751 and 7,179,864, which are incorporated herein by reference. The inorganic fillers may include, without limitation, silica, aluminum hydroxide, magnesium hydroxide, clays (hydrated aluminum silicates), chemically-functionalized fillers, such as chemically-functionalized clays, other metal powders, other ceramic powders, and mixtures thereof.

In one or more embodiments, the carbon blacks may include any of the commonly available, commercially-produced carbon blacks. These include those having a surface area (EMSA) of at least 20 $m^2$/gram and in other embodiments at least 35 $m^2$/gram up to 200 $m^2$/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used in preparing the carbon black products of the invention. Exemplary carbon blacks include those bearing ASTM designation (D-1765-82a) N-110, N-220, N-339, N-330, N-351, N-550, and N-660. In one or more embodiments, the carbon black may include oxidized carbon black.

In one or more embodiments, silica (silicon dioxide) includes wet-process, hydrated silica produced by a chemical reaction in water, and precipitated as ultra-fine spherical particles. In one embodiment, the silica has a surface area of about 32 to about 400 $m^2$/g, in another embodiment about 100 to about 250 $m^2$/g, and in yet another embodiment, about 150 to about 220 $m^2$/g. The pH of the silica filler in one embodiment is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber). Where silica is employed, it may be useful to use a silica coupling agent. Silica coupling agents are further described in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 and 5,696,197, 6,608,145, and 6,667,362, which are incorporated herein by reference.

The cure system may include a multitude of rubber curing agents including, but not limited to, sulfur-based compounds, metal oxide, or peroxide-based curing systems. Vulcanizing agents may be used alone or in combination. Sulfur-based compounds include those compounds conventionally employed in the art of making tires. These compounds may also be referred to as sulfur or sulfur crosslinking agents. In one or more embodiments, sulfur includes free sulfur, which may also be referred to as elemental sulfur, as well as those compounds known in the art to be sulfur donor compounds (e.g. thiurams such as thiuram disulfide).

Curing agents are described in Kirk-Othmer, Encyclopedia of Chemical Technology, 365-468, (3rd Ed. 1982), particularly Vulcanization Agents and Auxiliary Materials, 390-402, A. Y. Coran, Vulcanization in Encyclopedia of Polymer Science and Engineering, (2nd Ed. 1989), Frederick R. Erich, Science and Technology of Rubber, Chapter 7, Academic Press (1978), Robert F. Ohm, The Vanderbilt Rubber Handbook, pp. 92-122 (13th Ed. 1990), Krishna C. Baranwal & Howard L. Stephens, Basic Elastomer Technology, Chapter 9, (1st Ed. 2001), and Maurice Morton, Rubber Technology, Chapter 10, (2nd Ed. 1981), which are incorporated herein by reference.

Inasmuch as the practice of the present invention does not necessarily alter conventional practices for preparing tires and tire components, the vulcanizable compositions employed in practicing the present invention may include those various ingredients that have been included in vulcanizable compositions for preparing tires and tire components. These ingredients include, for example and not limited to, accelerators, oils, waxes, scorch inhibiting agents, processing aids, zinc oxide, tackifying resins, reinforcing resins, fatty acids such as stearic acid, peptizers, antiozonants, antidegredants, and antioxidants.

In one or more embodiments, the amount of filler within the vulcanizable composition may be expressed as a volume percent of the vulcanizable composition. In one or more embodiments, at least 10%, in other embodiments at least 12%, in other embodiments at least 15%, and in other embodiments at least 18% of the volume of the vulcanizable composition includes filler. In these or other embodiments, less than 30%, in other embodiments less than 27%, in other embodiments less than 25%, and in other embodiments less than 22% of the volume of the vulcanizable composition includes filler.

In one or more embodiments, the amount of filler within the vulcanizable composition of the present invention may also be expressed with respect to the weight of the rubber component. In one or more embodiments, the vulcanizable composition includes at least 1 parts by weight, in other embodiments at least 10 parts by weight, in other embodiments at least 20 part by weight, in other embodiments at least 40 parts by weight, and in other embodiments at least 60 parts by weight filler per 100 parts by weight rubber. In these or other embodiments, the vulcanizable composition includes less than 140 parts by weight, in other embodiments less than 120 parts by weight, in other embodiments less than 100 parts by weight, in other embodiments less than 90 parts by weight, and in other embodiments less than 80 parts by weight filler per 100 parts by weight rubber.

In one or more embodiments, the amount of boron nitride within the vulcanizable compositions of matter may be expressed as a volume percent of the overall volume of the filler. In one or more embodiments, at least 0.1%, in other embodiments at least 1%, and in other embodiments at least 2% of the volume of the filler component includes boron nitride. In these or other embodiments, up to and including 100%, in other embodiments up to 50%, in other embodiments up to 15%, in other embodiments less than 10%, in other embodiments less than 8%, in other embodiments less than 6%, in other embodiments less than 5%, and in other embodiments less than 4% of the volume of the filler component includes boron nitride. In one or more embodiments, the balance of the filler may include reinforcing filler such as carbon black or silica.

In one or more embodiments, the amount of boron nitride within the vulcanizable composition of the present invention may also be expressed with respect to the weight of the rubber component. In one or more embodiments, the vulcanizable composition includes at least 0.1 parts by weight, in other embodiments at least 0.5 parts by weight, in other embodiments at least 1 part by weight, in other embodiments at least 3 parts by weight, and in other embodiments at least 6 parts by weight boron nitride per 100 parts by weight rubber. In these or other embodiments, the vulcanizable composition includes less than 140 parts by weight, in other embodiments less than 70 parts by weight, in other embodiments less than 20 parts by weight, in other embodiments less than 14 parts by weight, in other embodiments less than 12 parts by weight, in other embodiments less than 10 parts by weight, in other embodiments less than 8 parts by weight, and in other embodiments less than 6 parts by weight boron nitride per 100 parts by weight rubber.

In one or more embodiments, the amount of carbon black within the vulcanizable compositions of matter may be expressed as a volume percent of the overall volume of the filler. In one or more embodiments, at least 1%, in other embodiments at least 10%, in other embodiments at least 80%, and in other embodiments at least 90% of the volume of the filler component includes carbon black. In these or other embodiments, up to 99.9%, in other embodiments less than 99%, in other embodiments less than 96%, and in other embodiments less than 95% of the volume of the filler component includes carbon black.

In one or more embodiments, the amount of carbon black within the vulcanizable composition of the present invention may also be expressed with respect to the weight of the rubber component. In one or more embodiments, the vulcanizable composition includes at least 1 parts by weight, in other embodiments at least 10 parts by weight, in other embodiments at least 20 part by weight, in other embodiments at least 30 parts by weight, and in other embodiments at least 60 parts by weight carbon black per 100 parts by weight rubber. In these or other embodiments, the vulcanizable composition includes less than less than 140 parts by weight, in other embodiments less than 120 parts by weight, in other embodiments less than 100 parts by weight, in other embodiments less than 80 parts by weight, and in other embodiments less than 60 parts by weight carbon black per 100 parts by weight rubber.

In one or more embodiments, the amount of silica within the vulcanizable compositions of matter may be expressed as a volume percent of the overall volume of the filler. In one or more embodiments, at least 1%, in other embodiments at least 10%, in other embodiments at least 80%, and in other embodiments at least 90% of the volume of the filler component includes silica. In these or other embodiments, up to 99.9%, in other embodiments less than 99%, in other embodiments less than 96%, and in other embodiments less than 95% of the volume of the filler component includes silica.

In one or more embodiments, the amount of silica within the vulcanizable composition of the present invention may also be expressed with respect to the weight of the rubber component. In one or more embodiments, the vulcanizable composition includes at least 1 parts by weight, in other embodiments at least 10 parts by weight, in other embodiments at least 20 part by weight, in other embodiments at least 30 parts by weight, and in other embodiments at least 60 parts by weight silica per 100 parts by weight rubber. In these or other embodiments, the vulcanizable composition includes less than less than 140 parts by weight, in other embodiments less than 120 parts by weight, in other embodiments less than 100 parts by weight, in other embodiments less than 80 parts by weight, and in other embodiments less than 60 parts by weight silica per 100 parts by weight rubber.

The compositions of this invention can be prepared by employing conventional mixing techniques. In one or more embodiments, the vulcanizable composition, which may also be referred to as a rubber mixture, may be prepared by forming an initial masterbatch that includes the rubber component and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients can be added during these remills. Rubber compounding techniques and the additives employed therein are disclosed in Stephens, The Compounding and Vulcanization of Rubber, in Rubber Technology (2nd Ed. 1973). The mixing conditions and procedures applicable to silica-filled tire formulations are also well known as described in U.S. Pat. Nos. 5,227,425, 5,719,207, and 5,717,022, all of which are incorporated herein by reference.

In one or more embodiments, the tires and tire components of the present invention may be prepared by using conventional practices. In one or more embodiments, the vulcanizable composition may be shaped through conventional calendering or milling techniques to form a strip of uncured compounded rubber (i.e. green rubber) of appropriate width.

In order to demonstrate the practice of the present invention, the following examples have been prepared and tested. The examples should not, however, be viewed as limiting the scope of the invention. The claims will serve to define the invention.

Experimental

Samples 1-7

Seven vulcanizable compositions of the type commonly used to prepare tire treads were prepared. Each composition included 50 parts by weight, per 100 parts by weight rubber, of N343 carbon black. Samples demonstrating practice of the present invention were prepared by including boron nitride in various amounts as provided in Table I. Three different types of boron nitride were employed. One was AC6004 (Momentive), which was believed to be a single-crystal hexagonal platelets characterized by a particle size of about 12-13 micrometers. Another boron nitride was PT110 (Momentive), which was believed to be large single-crystal powders in the typical hexagonal platelet shape with an average particle size of about 45 micrometers. The other was HCP (Momentive), which was believed to be single-crystal powders in the typical hexagonal platelet shape with an average particle size of about 7 to about 10 micrometers.

The formulation was then sheeted on a two-roll mill to an appropriate thickness as required for particular molds for particular tests. For certain tests, the sheets were cured within a hydraulic press. Depending on the test specifications, test specimens were dye-cut to the desired shapes.

(Momentive), and 10 parts by weight HCP (Momentive). This vulcanizable composition was prepared, molded, and cured using conventional techniques as used in the previous samples.

This sample (Sample 8) and Sample 1 above, which included 50 parts by weight carbon black, were analyzed for thermal conductivity at 30° C., 60° C., and 90° C. by Netzsch Instruments on a Lambda HFM 436. The results of these tests are provided in Table II. As shown in Table II, Sample 8 (30 phr boron nitride) showed a higher thermal conductivity at all temperatures than Sample 1. The uncertainty in the measurement is +/−3%. At 30° C., the thermal conductivity of Sample 8 is 0.280 W/Km as compared to Sample 1 at 0.246 W/Km. This is a 14% increase and indicates improved heat dissipation capability.

TABLE II

| Sample No. | Temperature (° C.) | Thermal Conductivity (W/m * K) |
|---|---|---|
| Sample 1 | 30 | 0.246 |
|  | 60 | 0.246 |
|  | 90 | 0.243 |
| Sample 8 | 30 | 0.280 |
|  | 60 | 0.281 |
|  | 90 | 0.277 |

TABLE I

|  | Sample No. | | | | | | |
|---|---|---|---|---|---|---|---|
|  | 1 | 2 | 3 | 4 | 5 | 6 | 7 |
| Filler | | | | | | | |
| Carbon Black | 50 | 50 | 50 | 50 | 50 | 50 | 50 |
| HCP | 0 | 5 | 10 | 0 | 0 | 0 | 0 |
| PT110 | 0 | 0 | 0 | 5 | 10 | 0 | 0 |
| AC6004 | 0 | 0 | 0 | 0 | 0 | 5 | 10 |
| Properties | | | | | | | |
| Thermal Conductivity (W/m * K) | 0.246 | 0.257 | 0.269 | — | — | — | — |
| ML1 + 4 (130° C.) | 43.0 | 42.5 | 43.0 | 42.0 | 42.3 | 43.1 | 42.6 |
| t90 Cure Time | 4.02 | 4.28 | 3.74 | 3.99 | 4.05 | 3.90 | 3.85 |
| Tanδ (60° C.) | 0.1909 | 0.1914 | 0.2039 | 0.1966 | 0.2011 | 0.1892 | 0.2015 |
| M300 (Mpa) | 13.0 | 13.0 | 12.5 | 13.0 | 12.8 | 13.1 | 12.6 |
| Peak Stress (Mpa) | 20.1 | 21.1 | 21.1 | 20.6 | 18.3 | 19.8 | 20.4 |
| % Elongation | 428.6 | 458.7 | 469.7 | 438.4 | 401.2 | 422.6 | 481.5 |
| ΔG' (Mpa) | 1.25 | 1.59 | 1.89 | 1.47 | 1.78 | 1.55 | 1.86 |

As shown in Table I, the addition of boron nitride was not shown to significantly affect the mechanical properties. For example, the cure rate, Mooney Viscosity 130° C., hysteresis at 60° C., M300 at 23° C., Peak Stress at 23° C., and % Elongation to break at 23° C. were not deleteriously impacted. Compared to the control sample, there is a slight increase in the ΔG', obtained from strain sweep measurements, with the addition of boron nitride filler, but this is consistent with all rubber samples that have increased filler loading. Table I also provides the thermal conductivity for Samples 1-3, which data was obtained in accordance with ASTM C177.

Sample 8

An additional vulcanizable sample was prepared that included 30 parts by weight boron nitride per 100 parts by weight rubber. The 30 parts of boron nitride included 10 parts by weight AC6004 (Momentive), 10 parts by weight PT110

Samples 1 and 8 were also evaluated for heat build up within the samples during a high strain fatigue test by using an MTS instrument. A 15% elongational strain was applied to the sample, which was cut 3"×8", at a frequency of 1 Hz for several hours while the surface temperature of the rubber was monitored with IR thermometer from EXTECH Instruments. The heat build up within the sample was recorded +/−1 C. The results of these tests are provided in Table III. As shown in Table III, the heat build for Sample 1 occurred within the first 15 minutes of testing and then leveled off at the elevated temperature for the full duration of the test, which was 8 hours. Advantageously, the temperature of Sample 8 remained fairly constant at 23° C. throughout the 8-hour test. Therefore the heat build up in the all carbon black sample is 5° C., while it is negligible in the all boron nitride sample.

TABLE III

| Time (min) | Sample 1 Temperature (° C.) | Sample 8 Temperature (° C.) |
| --- | --- | --- |
| 0 | 22 | 22 |
| 1 | 23 | 23 |
| 2 | 24 | — |
| 3 | 25 | 23 |
| 4 | 25 | 24 |
| 5 | 26 | 24 |
| 6 | 26 | — |
| 7 | 26 | 23 |
| 8 | 27 | — |
| 9 | 27 | 22 |
| 10 | 27 | — |
| 11 | 27 | 22 |
| 12 | 28 | — |
| 13 | 28 | 23 |
| 14 | 28 | — |
| 15 | 28 | 23 |
| 16 | 28 | — |
| 17 | 27 | — |
| 18 | 27 | — |
| 420 | 27 | 23 |

Various modifications and alterations that do not depart from the scope and spirit of this invention will become apparent to those skilled in the art. This invention is not to be duly limited to the illustrative embodiments set forth herein.

What is claimed is:

1. A tire comprising:
at least one cured rubber component having a filler component dispersed within a cured rubber matrix, the filler component including carbon black, a first boron nitride, and a second boron nitride, where the first boron nitride is characterized by a first particle size and the second boron nitride is characterized by a second particle size, and where the first particle size is larger than the second particle size;
where the cured rubber component includes, on a volume basis, at least 10% and less than 30% of the filler component, and where the filler includes, on a volume basis, at least 0.1% and less than 10% of the first and second boron nitride.

2. The tire of claim 1, where the cured rubber component is selected from the group consisting of a tread, a sidewall, a belt package, a bead, and a carcass.

3. The tire of claim 1, where the cured rubber matrix further includes silica dispersed therein.

4. The tire of claim 1, where the balance of the volume of the filler component includes carbon black or silica.

5. The tire of claim 1, where the rubber component includes at least 0.1 and at most 12 parts by weight of the first and second boron nitride per 100 parts by weight rubber.

6. The tire of claim 1, where the rubber component derives from the vulcanization of a rubber that is selected from the group consisting of natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, and epichlorohydrin rubber.

7. The tire of claim 6, where the rubber component derives from the vulcanization of a rubber component that is selected from the group consisting of synthetic polyisoprene, polybutadiene, polyisobutylene-co-isoprene, poly(styrene-co-butadiene), poly(styrene-co-isoprene), poly(styrene-co-isoprene-co-butadiene), and poly(isoprene-co-butadiene).

8. The tire of claim 1, where the cured rubber component includes, on a volume basis, less than 25% of the filler component.

9. The tire of claim 1, where the cured rubber component includes, on a volume basis, less than 20% of the filler component.

10. The tire of claim 1, where the rubber component includes at least 0.5 and at most 10 parts by weight of the first and second boron nitride per 100 parts by weight rubber.

11. The tire of claim 1, where the rubber component includes at least 1.0 and at most 8 parts by weight of the first and second boron nitride per 100 parts by weight rubber.

* * * * *